Feb. 2, 1926.

P. BARDUCCI 1,571,226

DRYING PLANT

Filed Jan. 19, 1920

4 Sheets-Sheet 1

Inventor:
Pilade Barducci
By Lawrence Langner
Attorney.

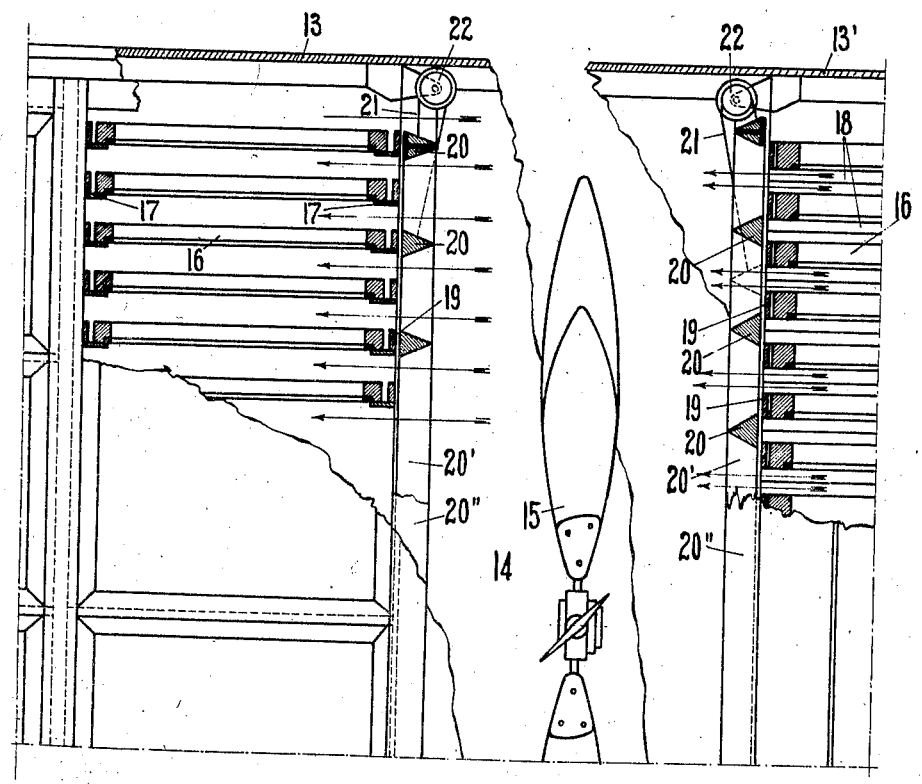

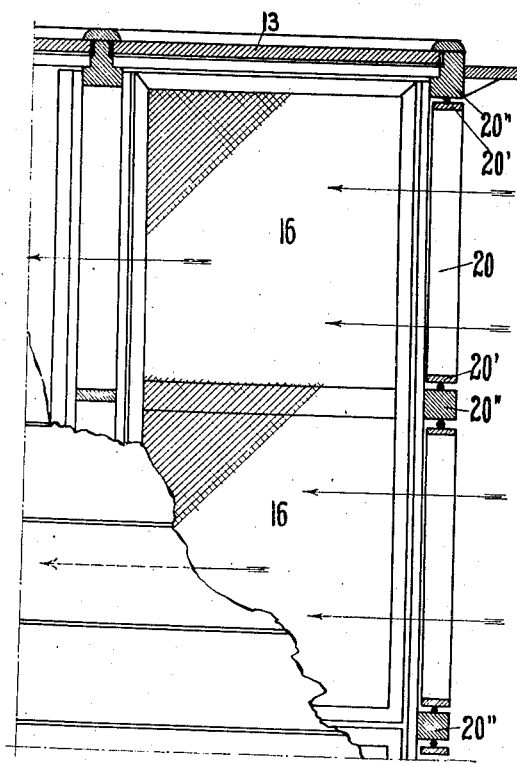
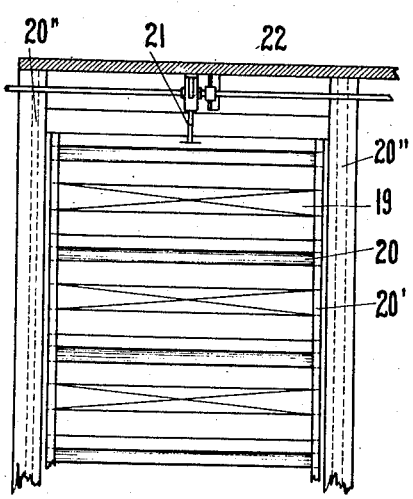
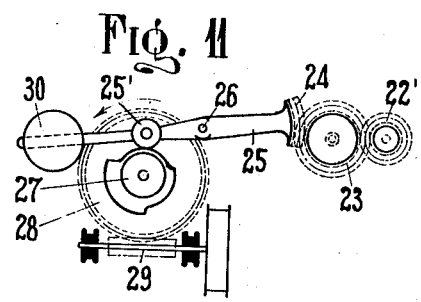
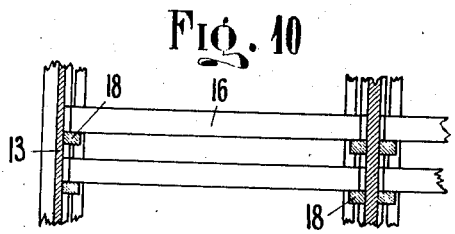
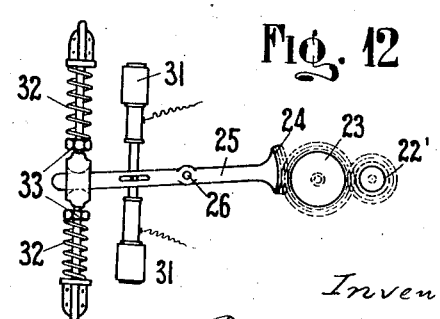

Feb. 2, 1926.

P. BARDUCCI

DRYING PLANT

Filed Jan. 19, 1920

1,571,226

4 Sheets-Sheet 4

Inventor:
Pilade Barducci
By Lawrence Langner
Attorney

Patented Feb. 2, 1926.

1,571,226

UNITED STATES PATENT OFFICE.

PILADE BARDUCCI, OF NAPLES, ITALY.

DRYING PLANT.

Application filed January 19, 1920. Serial No. 352,266.

*To all whom it may concern:*

Be it known that I, PILADE BARDUCCI, a subject of the King of Italy, and resident of Naples, Italy, have invented certain new and useful Improvements in Drying Plants, of which the following is a specification.

This invention relates to means for producing a ventilation in drying plants and has for its object an arrangement allowing of varying, in succession, the intensity of the ventilation in the several portions of the room containing the material to be dried, without moving the material, moving or stopping the fan, or modifying the speed of the same.

The arrangement, according to this invention, is therefore particularly useful in plants of reduced size in which it is not advisable to provide for a relative travel between the material and the fans.

In its preferred form this invention comprises a room in which there are provided chambers or spaces adapted to contain the material to be dried as well as controlling or distributing means adapted to supply air to the same and to cut off said supply at alternating periods, a periodic ventilation being thus obtained in said spaces according to any desired or predetermined arrangement.

Figure 1:
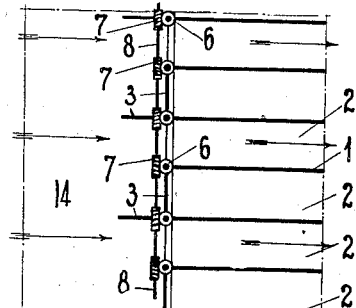
Figure 2:
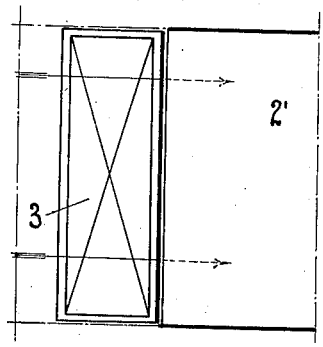
Figure 13:
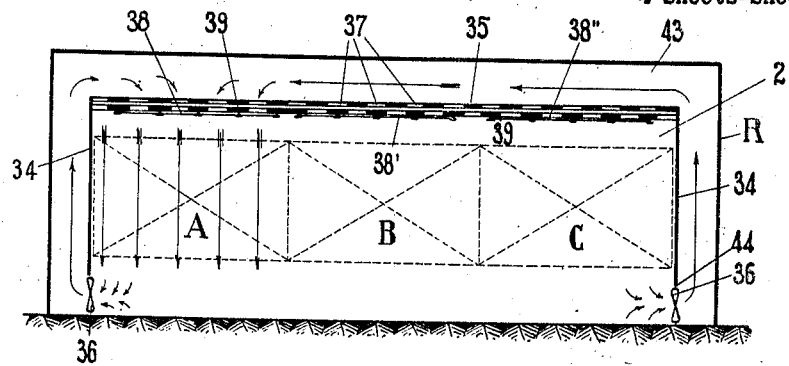
Figure 14:
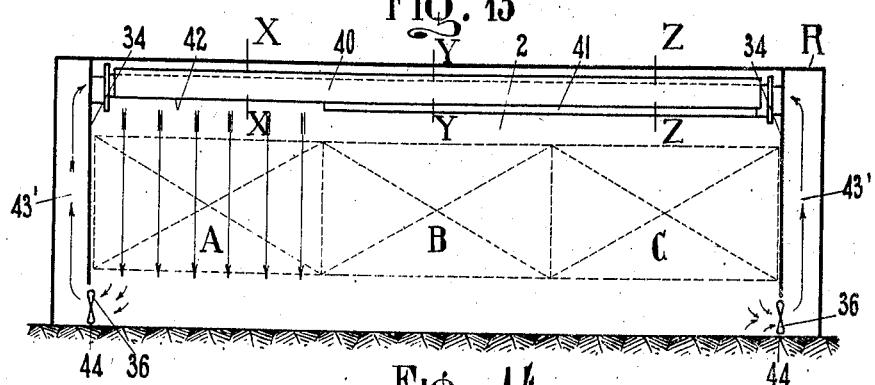
Figures 15, 16, 17:
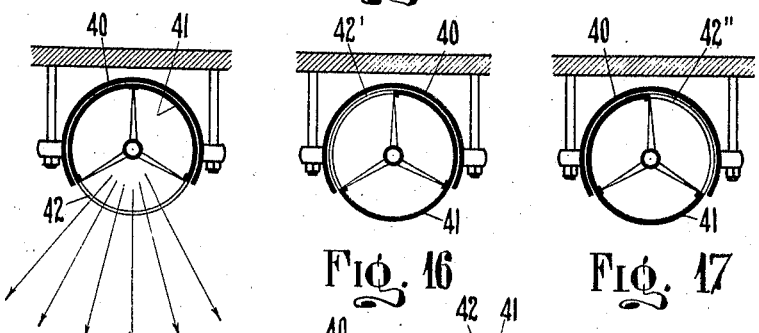
Figure 18:
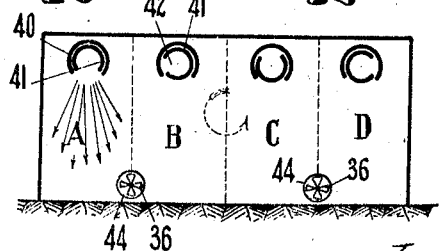

In the annexed drawings are shown diagrammatically some embodiments of this invention. In said drawing Figure 1 is the longitudinal vertical fragmentary section of a drying room according to this invention; Figure 2 is a similar view of another construction; Figures 3, 4, 5 and 6 are the vertical fragmentary sections of rooms divided into a number of chambers and each showing a different construction of devices for controlling the air supply in said chambers; Figure 7 is a fragmentary side view and longitudinal section on an enlarged scale of a portion of a room comprising two casings arranged in front of each other, an air propeller being located between said casings and driving into one of them the air drawn from the other one; Figure 8 is a plan section of one of said casings; Figure 9 is a front view of one of said casings showing the air distributing device; Figure 10 is a fragmentary transverse section of said casing; Figure 11 shows the construction of one form of the device operating the air distributing means; Figure 12 shows another form of construction of the same; Figure 13 is a vertical longitudinal section of a drying room in which the air is distributed without partitions providing separate chambers in said room; Figure 14 is a like section showing a modified construction of the drying room shown in Figure 13; Figures 15, 16 and 17 show on an enlarged scale the transverse sections of the air distributing means made on lines *x—x, y—y* and *z—z* of Figure 14 respectively; and Fig. 18 is a longitudinal section of a drying room provided with a modified construction of air distributing means.

In the case of constructions shown by Figures 1-6 the room R is provided with a number of partitions 1, arranged either horizontally or vertically, which form adjacent chambers 2, 2' intended to contain the material to be dried and having mouths opening into a common space 14 in which the air is moved by any suitable means as by a fan or propeller 15 causing air to enter into or be drawn from said chambers 2—2' through said mouths of the same.

The mouths of chambers 2—2' are provided with shutters adapted to control the flow of air therethrough. In the construction shown by Figures 1 and 2 said shutters consist of hinged plates or baffles 3 suitably mounted and provided with gears 6 meshing with gears or screws 7 fixed to a shaft 8 operated by any suitable means manually or automatically; in the construction shown by Figure 3 said shutters consist of butterfly valves or plates 4 pivoted around their longitudinal axes and operated by gears 6 and 7 and a common shaft 8.

Figure 5:
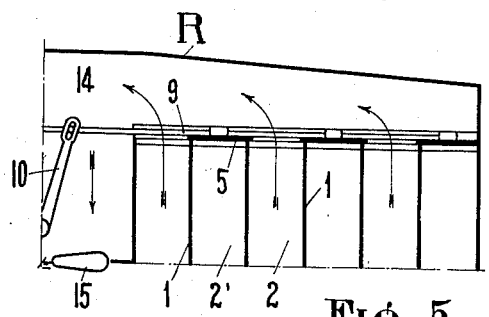

In a construction shown in Fig. 5 the mouths of chambers 2—2' are controlled by sliding plates 5 adapted to register therewith and be controlled by a common reciprocating rod 9 operated by a lever 10.

Figure 3:
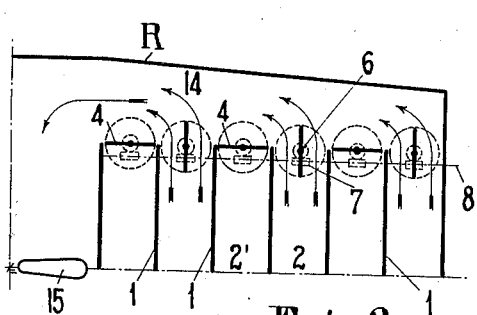

By means of the described arrangements the air flow through said chambers 2 and 2' may be controlled according to any required and predetermined arrangement by giving a suitable relative position to said shutters 3 and 4 whereby all the mouths of the chambers may be caused to be closed or opened at the same time, or whereby a number of the same may be open during the time in which the others are closed, as shown by Figures 1 and 3. For this purpose in the construction shown by Fig. 1, the worms 7 are alternately of reverse pitch.

On the contrary, by separately controlling said shutters in sets it is possible to provide that the interval during which the mouths of said chambers are left open differs with regard to the interval during which the mouths of the chambers remain closed and generally any required rule may be followed.

In the construction shown in Figure 5, by imparting a proper stroke to rod 9 and plates 5 each chamber is closed when the adjacent one is open and vice versa.

Figure 4:
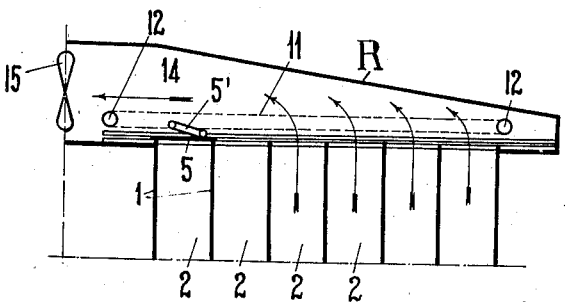

Figure 4 shows a construction comprising a single shutter plate 5 adapted to move into register with the mouths of chambers 2 seriatim, said plate being connected by a link 5' with an endless band 11 running over rollers 12 and operated by any suitable means. In this construction one only of the mouths of said chambers is closed at a time, while the others are left open and therefore each mouth and chamber is left open during a longer period than the same is closed.

Figure 6:
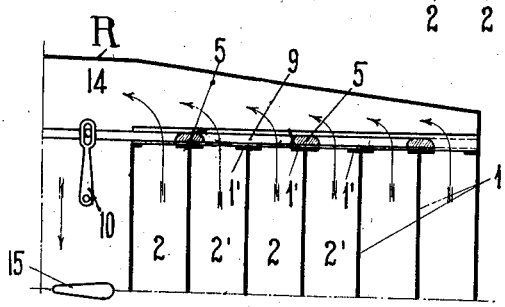

Figure 6 shows a construction in which the mouth of each chamber 2—2' is provided with a transverse plate 1' providing a restricted orifice; shutter plates 5 are adapted to move in front of said orifices, the same being controlled by a common rod 9 and lever 10, and each of said plates 5 is adapted to control the mouths of two adjacent chambers, thereby rendering the construction of the device simpler. With the construction it is possible to allow the mouths to be left open at the same time and further that the same are left open for a longer time than they are closed, for it will be seen that when plates 5 are in register with plates 1' all said mouths are open while when the same are in register with one of said mouths to close the same, the mouths of adjacent chambers are left open.

In the case the drying plant comprises a number of rooms each provided with chambers like to 2 and 2', it is possible to use a set of shutters adapted to close, at the same time, all the mouths of the chambers of one or of a number of said rooms, provided that at the same time the mouths of chambers of the other rooms are left open to allow the air to circulate at any time through a portion of the plant.

Such an arrangement is shown in Figs. 7–10 wherein two rooms or casings 13—13', or two series of rooms or casings, arranged in front of each other and having mouths opening in an intermediate space 14 in which is located an air propeller 15 adapted to drive air through said mouths into said rooms or casings.

Said casings or rooms 13—13' are adapted to receive frames 16 arranged above each other and adapted to carry the material to be dried. Said frames 16 may be inserted into the casing either from a side of the same as shown in connection with casing 13 in Figure 7, the same being carried by supporting members 17 transversely with regard to direction of air currents, or from the rear wall of the casing, as shown in casing 13', the same being held by longitudinal supports 18.

In any case, the walls of casings 13—13' in front of chamber 14 are formed by means of bars 19 spaced apart from each other to form mouths for the flow of air, said bars having a height equal to that of said bars of frames 16, increased if required of the thickness of supporting bars 17, so that the air flowing from the chamber 14 to casings 13—13' is divided into a number of individual streams or currents; also in the case a number of frames 16 are removed from said casings.

In front of said walls are mounted distributing means for controlling the flow of air through said mouths, said means comprising shutter rods or bars 20 mounted in a frame 20' arranged to slide in front of the wall of each casing within vertical guides 20'' (Figure 9) and actuated by any suitable means.

In the construction shown in said figures it is assumed that the ventilation of the casings must be effected in a manner like to that shown diagrammatically by Figure 6 say (1) all the mouths are open at the same time, (2) a half of the same are closed, (3) all the mouths are again open and (4) the other half of said mouths are closed.

The frame 20' carrying the shutter rod 20 must therefore be adapted to take three different positions and for this purpose it is adjustable, being hung from a chain or cord 21 or like member running over a roller 22 which is suitably operated.

Figure 11 shows a construction of a device for operating said roller 22; this device comprises a pinion 22' fixed to the roller 22 and meshing with an intermediate pinion 23 which gears with a toothed segment 24 carried by an arm 25 pivoted at 26. Said arm is provided with a roller 25' operated by a disk 27 having three cam surfaces and fixed to a gear wheel 28 driven by a worm wheel or screw 29 which in turn is operated by any suitable means. Said arm 25 is provided with means as a counterweight 30 for holding it with its roller 25' in contact with cam surface of disk 27. It is clear that on gears 29 and 28 being operated, the cam disk 27 causes arm 25 and segment 24 to take up three different positions and therefore wheels 23—22'—22 are caused to operate said cord 21 and frame 20' so as to carry this latter in the required positions in a repeated succession.

Figure 12 shows a modified construction of said operating device in which said arm 25 is held in its intermediate position by means of springs 32 which may be adjusted by nuts 33, and the same is shifted in either direction by electromagnets 31 which are arranged at the two sides thereof.

It is to be understood that any other known or proper device may be used for controlling the shutter frame or means according to the required rule of ventilation to be obtained in the chambers.

Figures 13, 14 and 18 show constructions of the drying room in which the same is not provided with partitions forming separate chambers in the space intended to contain the material to be dried, the air distributing means being so arranged as to produce in said space a number of individual air currents.

In the case of Figure 13 the chamber 2 intended to contain the material is enclosed by front walls 34 and by an upper wall 35 so as to provide within the room R a duct 43 extending along said chamber and in which the air is propelled by means of fans or propellers 36 mounted in suitable openings 44 provided in said walls 34.

The upper wall 35 is provided with a number of openings or mouths 37 for the flow of air and shutters are provided for controlling said flow of air to cause the required ventilation.

In said construction, the shutters comprise a number of plates 39 spaced from each other and adapted to slide in front of mouths 37 so as to close and open the same in the required succession. Said plates may be connected together in sets as shown by 38—38'—38'' each set being suitably operated so as to control the flow of air through corresponding sections of chamber 2 which are shown by references A—B—C respectively.

Any other suitable device may be used for controlling the air flow through said sections of the chamber, as baffles, valves or the like, which are suitably operated.

Figure 14 shows a construction in which the room R is provided with two transverse walls 34 providing therein a chamber 2 for the material to be dried as well as with two end ducts 43' communicating with said chambers by means of mouths or openings 44 in which are mounted air propellers 36. The chamber is provided with a longitudinal channel 40 in which is mounted a rotatable drum 41 opening at its ends into said ducts 43' and having slots or mouths 42, 42'—42'' each leading to one of the chamber sections A—B—C. As shown by Figures 15, 16, 17 the slots 42—42'—42'' are provided after each other along said drum 41 and the same are displaced angularly to each other so that by causing said drum to rotate step by step within its channel 40 to a third of revolution one of said mouths, say 42, is open and the other ones are closed at any time, this causing the air forced into said drum 41 to flow in succession through several sections A—B—C of the chamber.

Figure 18 shows such a construction comprising four drums 41 mounted inside channels 40 arranged parallel with each other, each of said drums having a single mouth 42 and being driven to rotate step by step of a fourth of revolution at each time. Any proper device not shown may be used for operating said drums the mouths of which are displaced angularly of 90° to each other, so that they supply air in each of the sections A, B, C, D of the chamber in succession.

Suitable means not shown are used for feeding air into drums 41 and other means as propellers 36 are used to exhaust air from the room.

In connection with subject matter disclosed but not claimed herein attention is called to my copending applications Serial Nos. 317,900 filed August 16, 1919, 352,263 filed January 19, 1920, and 352,267 filed January 19, 1920, and my Patent No. 1,344,163 granted June 22, 1920.

What I claim as my invention and desire to secure by United States Letters Patent is:—

1. The herein described method of drying materials, which comprises causing an air stream, generated outside of the drying space, to act on the material during a number of periods, each period having a duration less than that required for the complete drying of said material, and in causing said periods to alternate with periods of rest during which periods or rests said air stream does not act on the material.

2. In a drier, the combination of a container for the material to be dried divided into separate sections, means outside of said container for producing air currents, and means for distributing the air currents to various sections of said container, said distributing means being adapted to alternately permit said air currents to pass through certain sections and prevent them from passing through the other sections of said container, and means for automatically controlling said distributing means according to a predetermined sequence.

3. In a drier, the combination of a container for the material to be dried divided into separate sections, means outside of said container for producing air currents, and means for distributing the air currents to various sections of said container, said distributing means being adapted to cause said air currents to be directed to certain of said sections while simultaneously preventing said air currents from being directed to other of said sections, and means for varying the position of said distributing means according to a predetermined sequence.

Signed at Naples, Italy, this 8th day of December A. D. 1919.

PILADE BARDUCCI.